United States Patent [19]

Iljunin et al.

[11] 4,130,460
[45] Dec. 19, 1978

[54] FUEL ASSEMBLY FOR FAST REACTOR

[76] Inventors: Vladimir G. Iljunin, ulitsa Zvezdnaya, 15, kv. 70; Viktor M. Murogov, ulitsa Lenina, 13/1, kv. 4; Mikhail F. Troyanov, ulitsa Lenina, 36a, kv. 30; Anatoly A. Rineisky, ulitsa Lyashenko, 2, kv. 35; Gennady G. Ustinov, ulitsa Koroleva, 18, kv. 18, all of Obninsk Kaluzhskoi oblasti; Anatoly N. Shmelev, Proletarsky prospekt, 77, kv. 96, Moscow, all of U.S.S.R.

[21] Appl. No.: 785,053

[22] Filed: Apr. 6, 1977

[51] Int. Cl.² ............................................... G21C 3/02
[52] U.S. Cl. ......................................... 176/68; 176/40
[58] Field of Search ..................... 176/40, 50, 60, 61, 176/65, 68, 76, 78

[56] References Cited

U.S. PATENT DOCUMENTS

| | | | |
|---|---|---|---|
| 3,156,625 | 10/1964 | Harty et al. | 176/61 X |
| 3,192,120 | 6/1965 | Campbell | 176/50 |
| 3,211,621 | 10/1965 | Gregan | 176/61 X |
| 3,238,105 | 3/1966 | McNelly | 176/68 X |
| 3,281,325 | 10/1966 | Hennig | 176/50 X |
| 3,368,946 | 2/1968 | Jenssen | 176/61 X |
| 3,393,127 | 7/1968 | Detman et al. | 176/61 |
| 3,505,170 | 4/1970 | Flowers et al. | 176/68 X |
| 3,713,971 | 1/1973 | Van Santen et al. | 176/50 X |

*Primary Examiner*—Peter A. Nelson
*Attorney, Agent, or Firm*—Lackenbach, Lilling & Siegel

[57] ABSTRACT

A fuel assembly for a fast-neutron reactor comprises a shroud having an upstream end and a downstream end. The shroud houses fuel elements having portions filled with fissionable and raw materials, corresponding fission-gas plenums to collect the gaseous products of fission and a shell. The fission-gas pleunums are divided into central and peripheral groups, and at least one of said groups is located downstream of the coolant before the portions of fuel elements filled with fissionable and raw materials. The shell is placed inside the shroud with a certain clearance with respect to its walls and is secured at one of its butt ends to the downstream end of said shroud.

12 Claims, 21 Drawing Figures

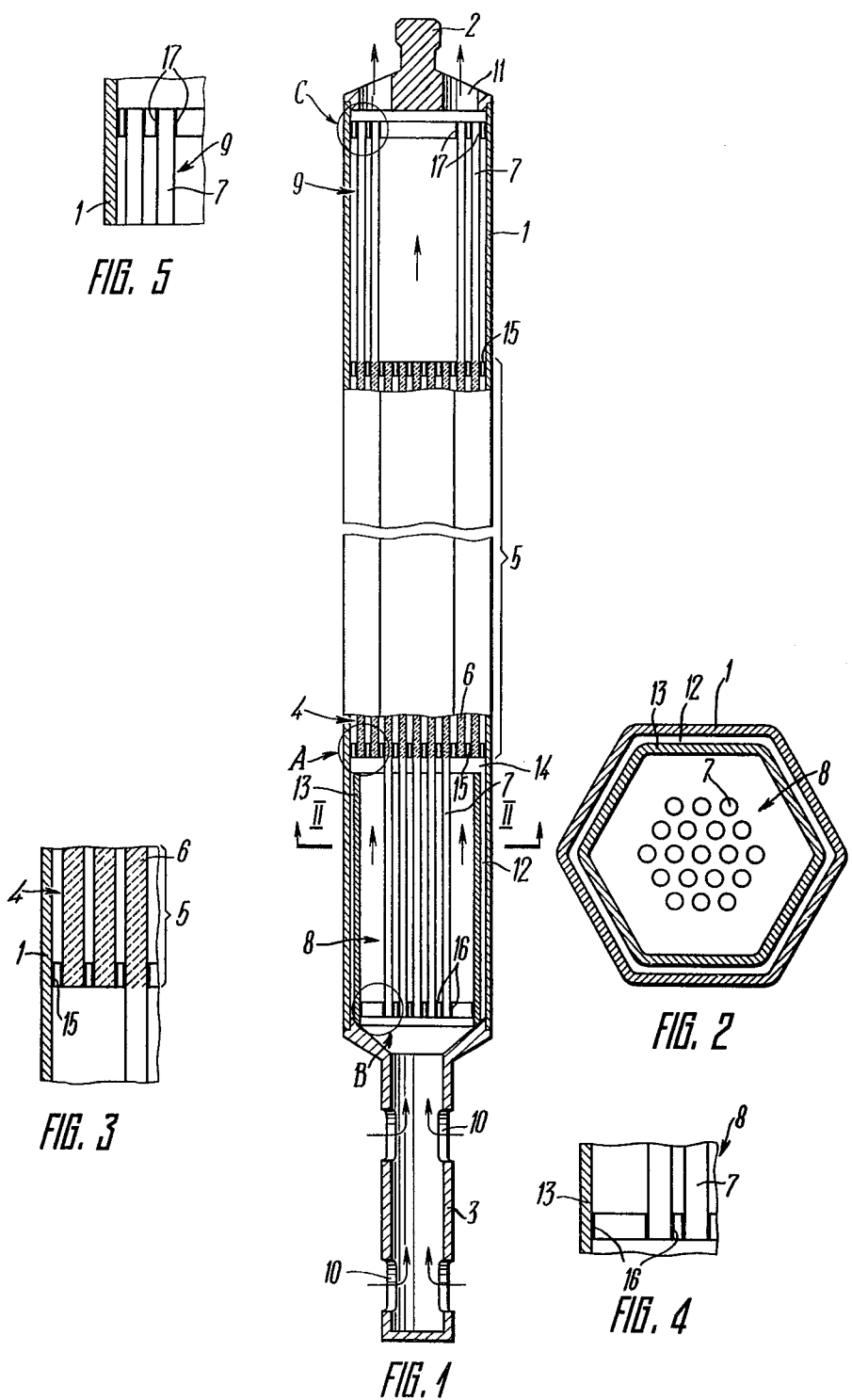

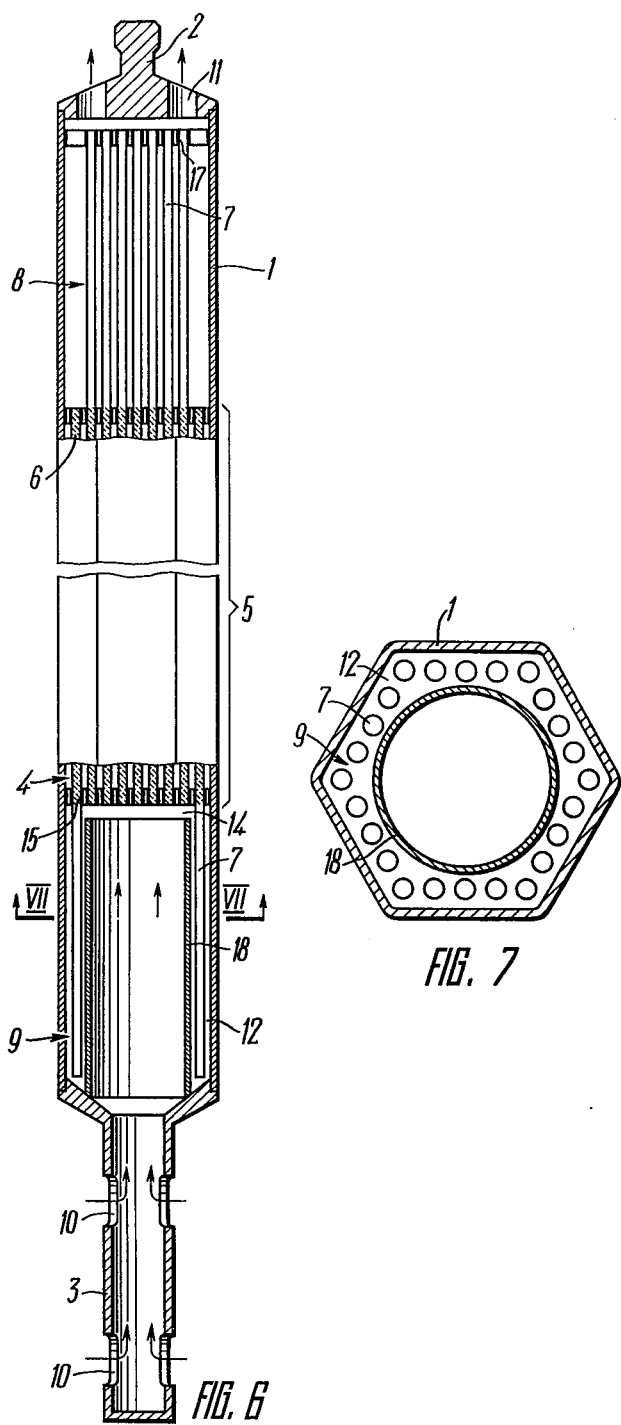

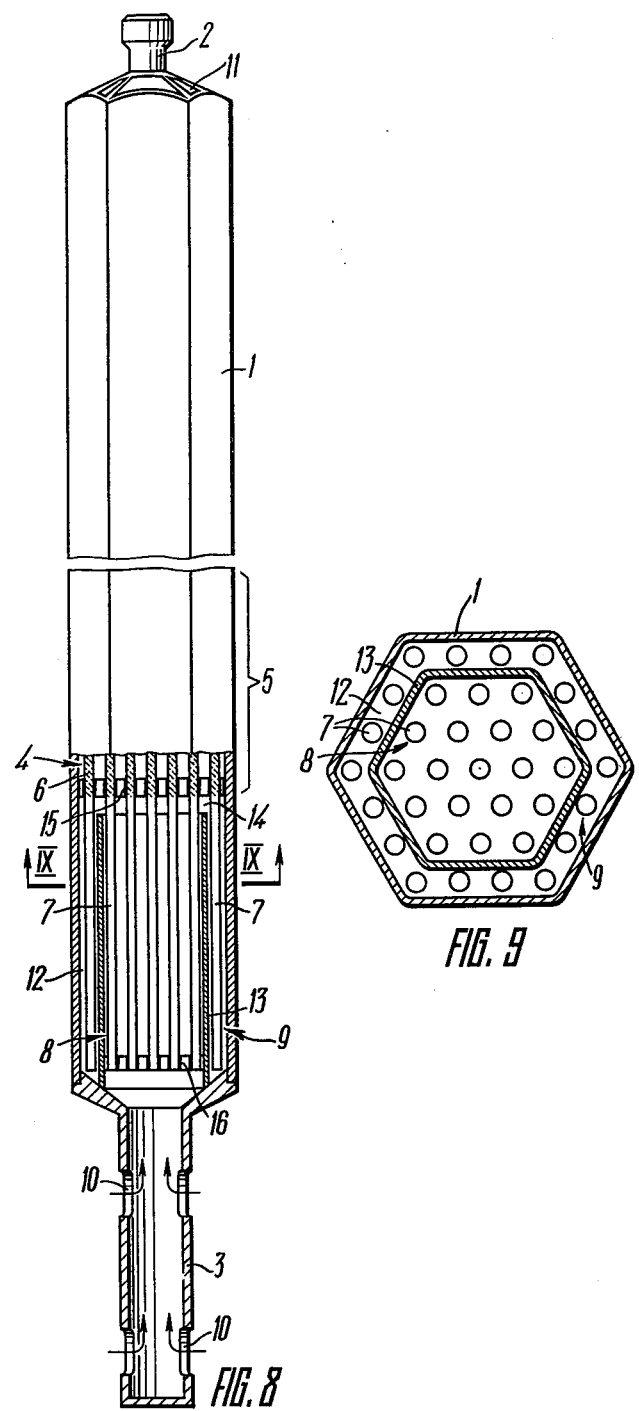

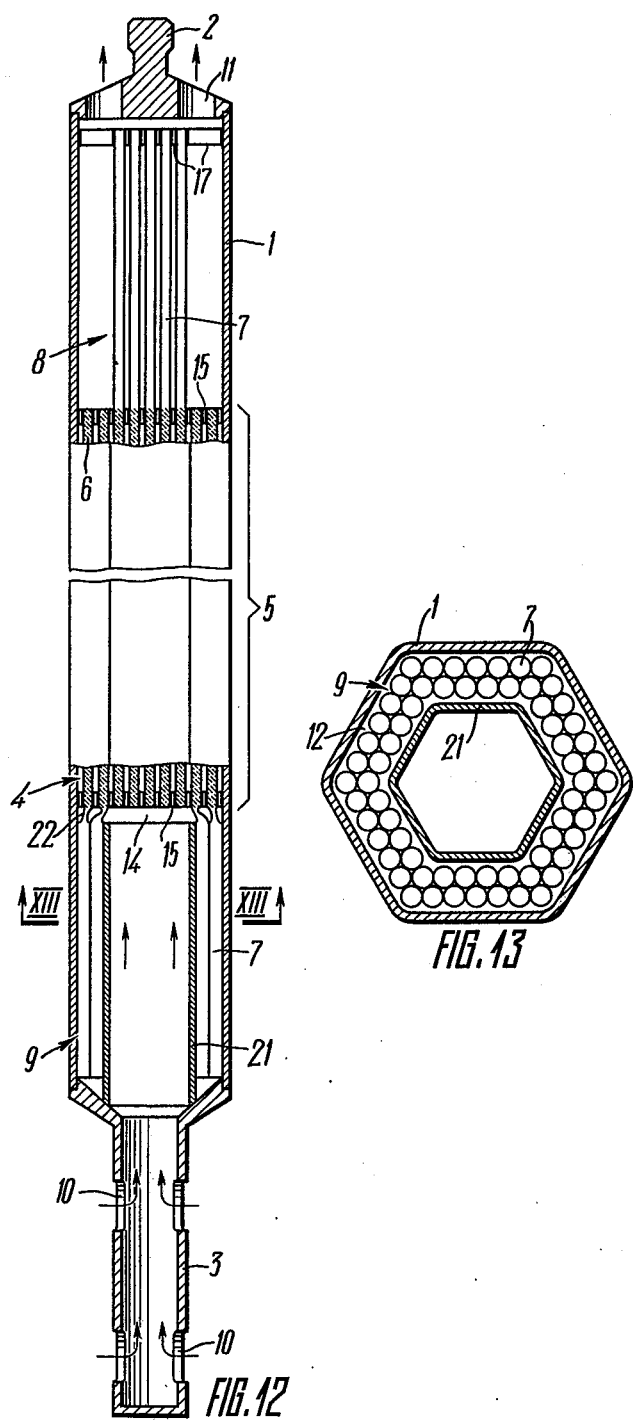

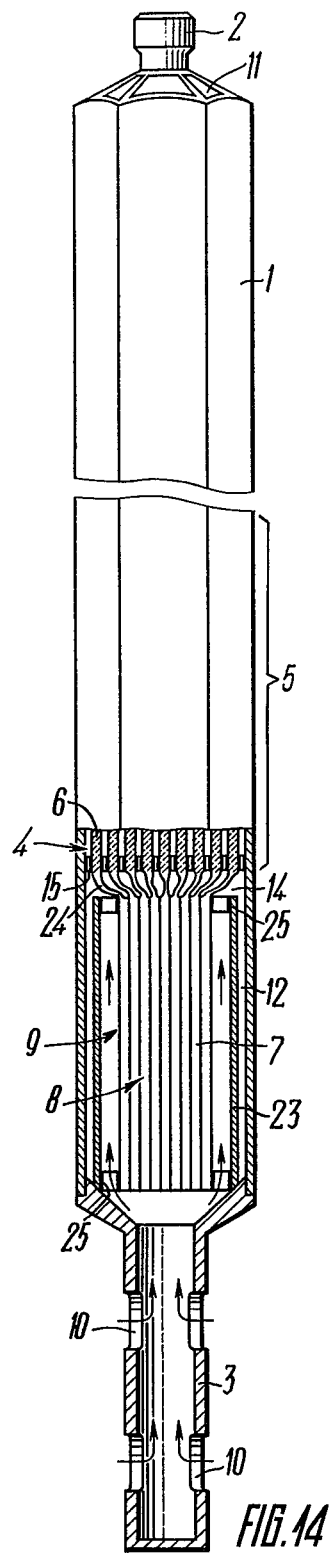
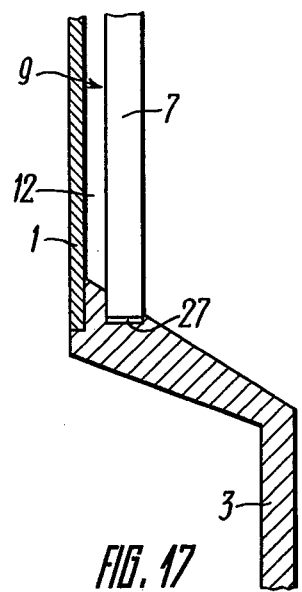
FIG. 14
FIG. 17

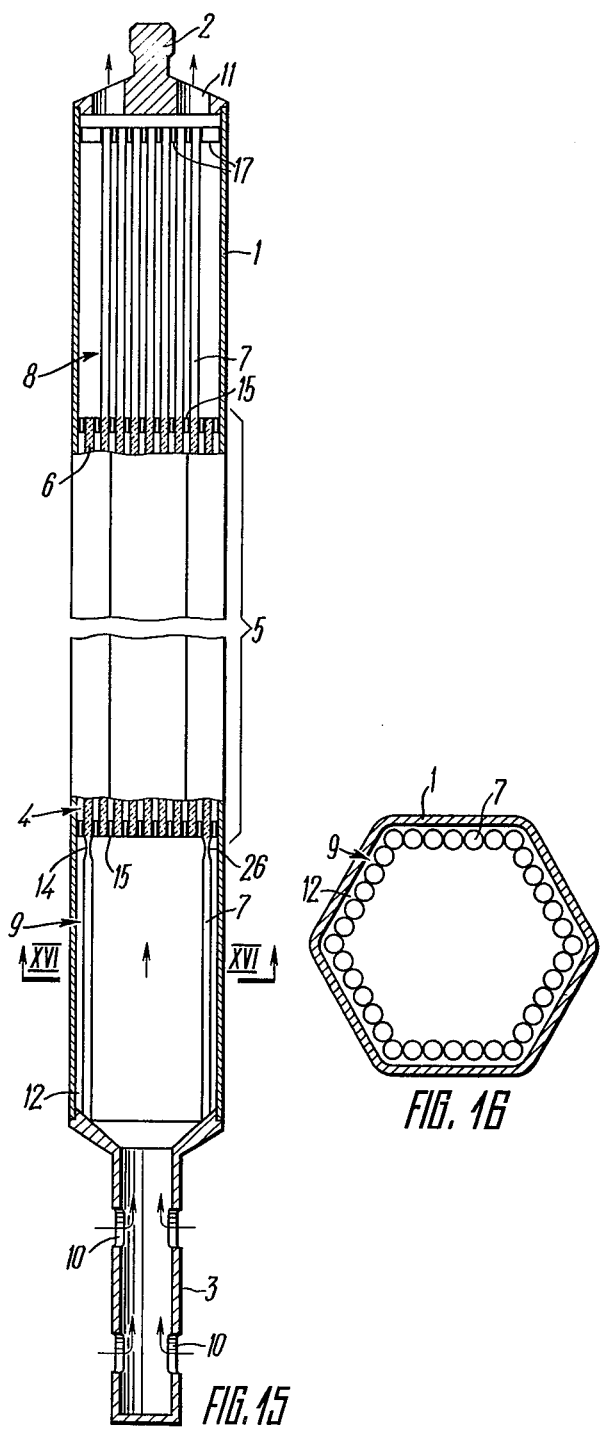

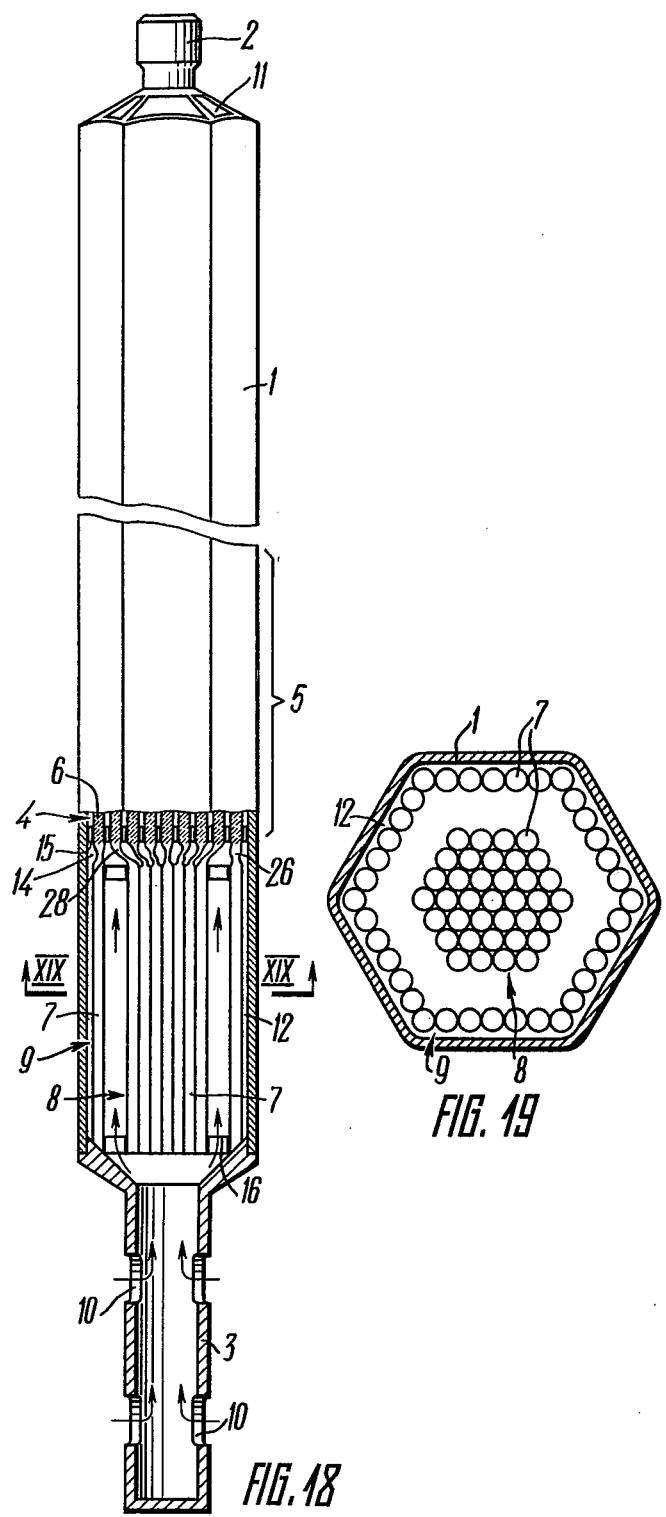

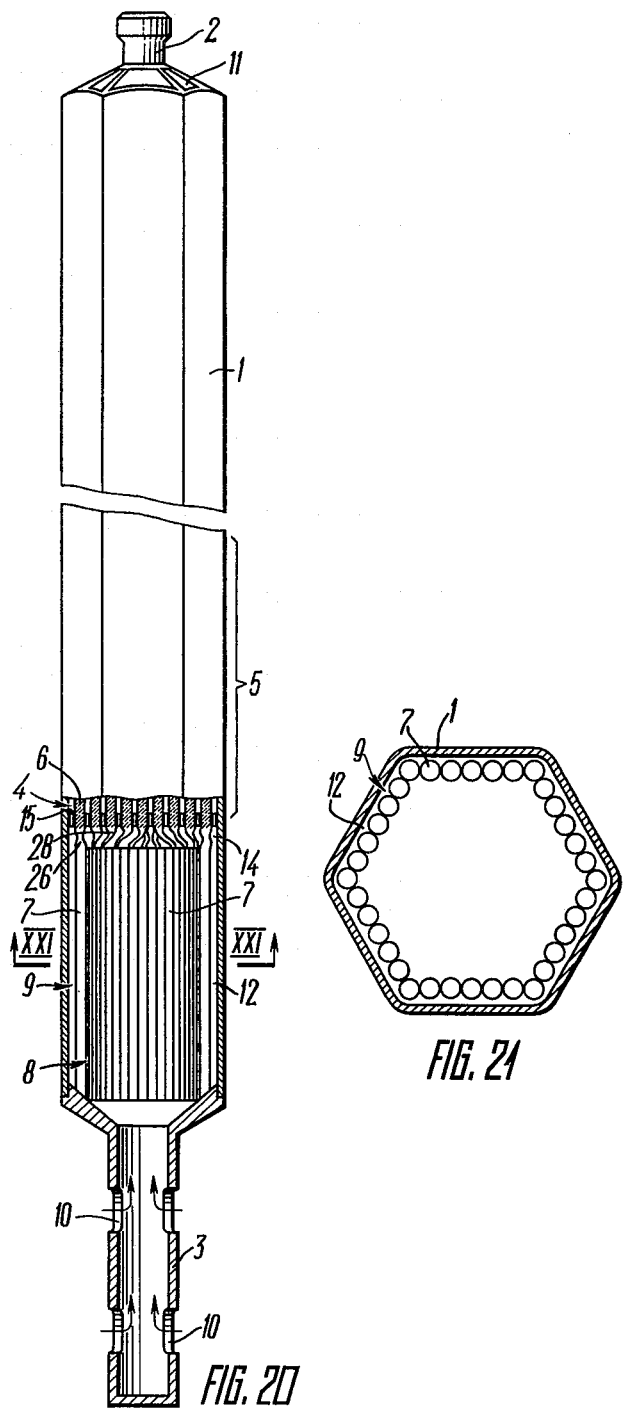

FUEL ASSEMBLY FOR FAST REACTOR

This invention relates to fast-neutron reactors and can be employed to improve the design of fuel assemblies constituting the active zone of a fast-neutron reactor.

Known in the art is a fuel assembly for a fast-neutron reactor (e.g. BN-350 /USSR/, Phenix/France/, PFR/Great Britain/) comprising a shroud having an upstream end and a downstream end and housing fuel elements having portions filled with fissionable and raw materials, and having corresponding gas plenums for collection of gaseous fission products. All fission-gas plenums are located inside the shroud of the fuel assembly downstream of the coolant either before or after the portions of the fuel elements filled with fissionable and raw materials.

With such design the shroud bears the difference of the pressure of the coolant flowing inside the fuel assembly and the coolant in the space between fuel assemblies in the active zone. The pressure in the space between fuel assemblies of the described type is equal to the pressure of the coolant at the outlet of the fuel assembly. The maximum pressure exerted on the shroud is, therefore, equal to the coolant pressure drop in the fuel assembly. Mechanical stresses in the material of the shroud dictate its greater thickness. This means that the volume of constructional materials in the active zone remains large, which is detrimental to the neutron balance in the active zone and, finally, deteriorates characteristics of a fast-neutron reactor as far as nuclear fuel breeding is concerned. Reduction of the volume of shroud walls in the active zone and, consequently, improvement of nuclear fuel conversion in fast-neutron reactors remain an important problem at present.

This problem is partially solved by reducing the flow resistance of the fuel assembly and, consequently, the coolant pressure drop therein. For this purpose the gas plenums for collection of gaseous fission products of the fuel elements of the assembly are divided into two groups: a central group comprising gas plenums located in the immediate vicinity of the longitudinal axis of the fuel assembly and a peripheral group.

Different groups of gas plenums of the fuel elements are situated in opposite ends of the fuel assembly with respect to its axis. For example, the gas plenums of the central group are located at the inlet of the coolant and the gas plenums of the peripheral group are located at the outlet of the coolant.

The coolant pressure drop in such a fuel assembly is, however, considerably large, as well as the thickness of the assembly shroud. Besides, such design provides for a significant increase of the overall length of the fuel assembly (additional length of a gas plenum), which complicates its manufacture and makes the reactor larger.

It is an object of this invention to provide a fuel assembly for a fast-neutron reactor ensuring reduction of the pressure exerted on the shroud.

Another object of this invention is to provide a fuel assembly for fast-neutron reactor ensuring reduction of the volume of shroud walls in the active zone of the fast-neutron reactor.

The invention is achieved by a fuel assembly for a fast-neutron reactor, which comprises a shroud having an upstream end and a downstream end housing fuel elements having portions filled with fissionable and raw materials, having corresponding gas plenums for collection of gaseous fission products, divided into a central group and. At peripheral group, at least one of said groups is located downstream of the coolant before the portions of the fuel elements filled with fissionable and raw materials. A shell is also provided, inside the shroud with a certain clearance with respect to its walls and is secured at one of its butt ends to the downstream end of the shroud.

It is advisable that the height of the shell be approximately equal to the length of the gas plenums for collection of gaseous fission products located downstream of the coolant before the portions of the fuel elements filled with fissionable and raw materials.

It is desirable that the external surface of the shell be made congruent to the internal surface of the shroud.

It is advisable that adjoining gas plenums for collection of gaseous fission products, located downstream of the coolant before the portions of the fuel elements filled with fissionable and raw materials, be arranged with respect to each other at a shorter distance than corresponding portions of the fuel elements filled with fissionable and raw materials.

In case the peripheral group gas plenums for collection of gaseous fission products are located downstream of the coolant before the portions of the fuel elements filled with fissionable and raw materials, the shell can be formed by the gas plenums of this peripheral group connected to one another.

Such a novel design of a fuel assembly of a fast-neutron reactor permits, reduction of the pressure rated for the shroud wall at a maximum coolant velocity, which ensures a reduction in the volume of constructional materials in the active zone and greater breeding gain of the fast-neutron nuclear reactor.

The invention will now be described with reference to specific embodiments thereof taken with the accompanying drawings, wherein:

FIG. 1 shows a vertical elevational view of a fuel assembly for a fast-neutron nuclear reactor, with portions thereof shown in section;

FIG. 2 shows a sectional view taken along the line II—II of FIG. 1;

FIG. 3 shows an enlarged portion A of FIG. 1;

FIG. 4 shows an enlarged portion B of FIG. 1;

FIG. 5 shows an enlarged portion C of FIG. 1;

FIG. 6 shows a similar vertical elevational view of another embodiment of a fuel assembly;

FIG. 7 shows a sectional view taken along the line VII—VII of FIG. 6;

FIG. 8 shows a similar vertical elevational view of yet another embodiment of a fuel assembly of a fast-neutron reactor;

FIG. 9 shows a sectional view taken along line IX—IX of FIG. 8.

FIG. 12 shows yet a similar vertical elevational view of another embodiment of a fuel assembly of a fast-neutron nuclear reactor provided with gas plenums brought into a compact bundle;

FIG. 13 shows a sectional view taken along the line XIII—XIII of FIG. 12;

FIG. 14 shows a similar vertical elevational view of yet another embodiment of the disclosed fuel assembly featuring gas plenums brought into a compact bundle;

FIG. 15 shows a similar vertical elevational view of a fuel assembly of a fast-neutron nuclear reactor, wherein the shell is formed by gas plenums of the peripheral groups;

FIG. 16 shows a section view taken along line XVI—XVI of FIG. 15;

FIG. 17 shows an enlarged view of parts of a wall, a downstream end and a shell of the fuel assembly of FIG. 15;

FIG. 18 shows a similar vertical elevational view of another embodiment of a fuel assembly, wherein the shell is formed by the gas plenums of the peripheral group;

FIG. 19 shows a section view taken along line XIX—XIX of FIG. 18;

FIG. 20 shows a similar vertical elevational view of still another embodiment of a fuel assembly, wherein the shell is formed by the gas plenums of the peripheral group; and FIG. 21 shows a sectional view taken along the line XXI—XXI of FIG. 20.

Figure 10:
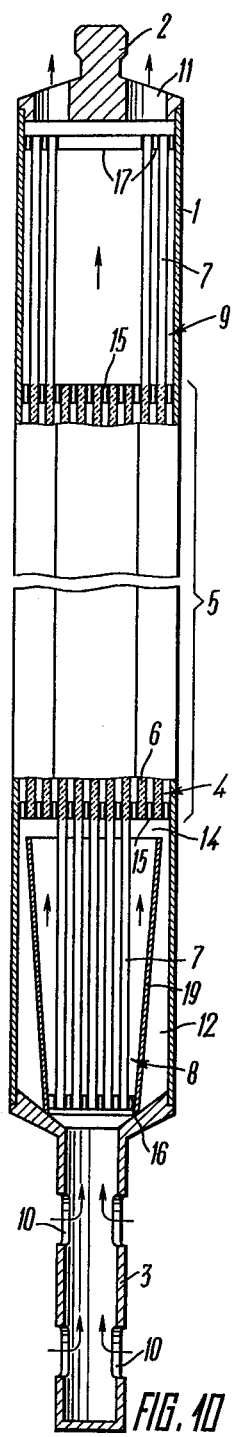
FIG. 10 shows a similar vertical elevational view of a fuel assembly provided with a shell made as a truncated cone.

A fuel assembly of a fast-neutron nuclear reactor comprises, according to the invention, a shroud 1 (FIG. 1) made as a hexagonal prism having an upstream end 2 and a downstream end 3. The shroud 1 houses fuel elements 4 having portions 5 filled with fissionable and raw materials 6 and corresponding gas plenums 7 for collection of gaseous fission products.

The gas plenums 7 are divided into a contral group 8 located in the immediate vicinity of the longitudinal axis of the fuel assembly and a peripheral group 9, at least one of said groups being located downstream of the coolant admitted into the shroud 1 through inlet ports 10 provided in the downstream end 3 before the portions 5 of the fuel elements 4 filled with fissionable and raw materials 6. The coolant leaves the shroud 1 through outlet ports 11 made in the upstream end 2.

In the disclosed embodiment the central group 8 of the gas plenums 7 is located downstream of the coolant before the portions 5 of the fuel elements 4 filled with the fissionable and raw materials 6 and the peripheral group 9 is located after the portions 5 of the fuel elements 4 downstream of the coolant in the shroud 1 of the fuel assembly.

A shell or additional partition means 13 made in this embodiment as a hexagonal prism is placed inside the shroud 1 with a certain clearance 12 with respect to its walls, is secured by one of its butt ends to the downstream end 3 and is arranged with a certain clearance 14 with respect to the portions 5 of the fuel elements 4 approximately equal to 3–5 cm. The height of the shell 13 is, therefore, approximately equal to the length of the gas plenums 7 for collection of gaseous fission products located downstream of the coolant before the portions 5 of the fuel elements 4 filled with the fissionable and raw materials 6. In the disclosed embodiment of the fuel assembly the height of the shell 13 is approximately equal to the length of the gas plenums 7 of the central group 8. With the shell 13 installed, the pressure exerted on the shroud 1 of the fuel assembly can be reduced by almost 30%. The gas plenums 7 of the central group 8 are located inside the shell 13.

The external surface of the shell 13 (FIG. 2) is congruent to the internal surface of the shroud 1. Such shape of the shell 13 permits a larger clear opening for the coolant inside the fuel assembly at the portion of the gas plenums 7 located before the portions 5 of the fuel elements 4.

The portions 5 (FIG. 3) of the fuel elements 4 filled with the fissionable and raw materials 6 are secured in the shroud 1 of the fuel assembly by means of spacing and fixing gratings 15. The gas plenums 7 (FIG. 4) placed inside the shroud 1 of the fuel assembly downstream of the coolant before the portions 5 of the fuel elements 4 are held in the shell 13 by means of a fixing grating 16, whereas the gas plenums 7 (FIG. 5) located after the portions 5 of the fuel elements 4 are held in the shroud 1 by means of a fixing grating 17.

The fuel assembly of FIG. 6 differs from the fuel assembly of FIG. 1 in that the shroud 1 houses gas plenums 7 for collection of gaseous fission products of the peripheral group 9 located downstream of the coolant before the portions 5 of the fuel elements 4 filled with the fissionable and raw materials 6, the gas plenums 7 of the central group 8 being located downstream of the coolant after the portions 5 of the fuel elements 4. In this case the gas plenums 7 of the peripheral group 9 are situated in the clearance 12 between the walls of the shroud 1 and a shell 18, as shown in FIG. 7. The shell 18 is made as a cylindrical tube or drum and it is not congruent to the shroud surface. The shell 18 is easy to manufacture.

Referring to FIGS. 8 and 9, an embodiment of a fuel assembly, according to the invention, is analogous to that of FIG. 1. The difference consists in that both the central group 8 and the peripheral group 9 of the gas plenums 7 for collection of gaseous fission products are located in the shroud 1 before the portions 5 of the fuel elements 4 filled with the fissionable and raw materials 6. In this case the gas plenums 7 of the central group 8 are situated inside the shell 13, whereas the gas plenums 7 of the peripheral group 9 are situated in the clearance 12 between the walls of the shroud 1 and the shell 13. The total height of the fuel assembly is here reduced by the length of the gas plenums 7, because there are no gas plenums after the portions 5 of the fuel elements 4 downstream of the coolant.

Another embodiment of a fuel assembly for a fast-neutron nuclear reactor, which can be successfully used, is provided, according to the invention, with a shell 19 (FIG. 10) made as a truncated cone drum with its smaller base secured to the downstream end 3. The angle between the diametrically opposite generatrices of the cone drum is equal to about 5°–10°. This permits a more uniform flow of the coolant at the approach to the portions 5 of the fuel elements 4.

The gas plenums 7 of the central group 8 are located inside the shell 19 downstream of the coolant before the portions 5 of the fuel elements 4.

Figure 11:
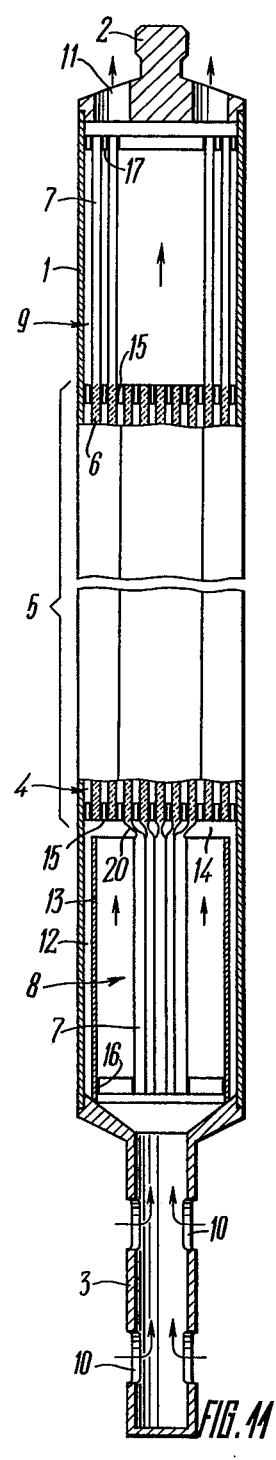
FIG. 11 shows a similar vertical elevational view of a fuel assembly for a fast-neutron nuclear reactor, wherein gas plenums for collection of gaseous fission products are brought into a compact bundle.

Another embodiment of a fuel assembly shown in FIG. 11 is made analogous to that of FIG. 1. The difference consists in that adjoining gas plenums 7 of the central group 8 for collection of gaseous fission product, located downstream of the coolant before the portions 5 of the fuel elements 4 filled with the fissionable and raw materials 6 are arranged with respect to one another at a shorter distance than corresponding portions 5 of the fuel elements 4 filled with the fissionable and raw materials 6, thus forming a compact bundle of said gas plenums 7. For this purpose these gas plenums 7 are provided immediately before portions 5 with portions 20 which diameters are less than the diameters of corresponding portions 5 of the fuel elements 4 filled with the fissionable and raw materials 6. These portions 20 on the gas plenums 7 permit better distribution of the coolant at the approach to the portions 5 of the fuel elements 4 filled with the fissionable and raw materials 6.

In another embodiment of a fuel assembly shown in FIG. 12 adjoining gas plenums 7 of the peripheral group 9, located downstream of the coolant before the portions 5 of the fuel elements 4 between the walls of the shroud 1 and a shell 21, are arranged with respect to each other at a shorter distance or pitch than the corresponding portions 5 of the fuel elements 4 forming a compact bundle of these gas plenums 7. For this purpose these gas plenums 7 are provided immediately before the portions 5 with portions 22 which diameters are less than the diameters of the corresponding portions 5 of the fuel elements 4 filled with the fissionable and raw materials 6.

The gas plenums 7 of the central group 8 are located in the shroud 1 downstream of the coolant after the portions 5 of the fuel elements 4. The shroud 1 (FIG. 13) and the shell 21 are made as hexagonal prisms. The external surface of the shell 21 is congruent to the internal surface of the shroud 1.

The portions 22 (FIG. 12) on the gas plenums 7 of the peripheral group 9 permit better distribution of the coolant at the approach to the portions 5 filled with the fissionable and raw materials 6 and the compact bundle of said gas plenums 7 permits a greater number of gas plenums 7 (FIG. 13) to be placed in the clearance 12.

The most effective is an embodiment of a fuel assembly of a fast-neutron nuclear reactor, wherein, according to the invention, all gas plenums 7 (FIG. 14) of the central group 8 and the peripheral group 9 are located inside a shell 23 downstream of the coolant before the portions 5 of the fuel elements 4 filled with the fissionable and raw materials 6 and are arranged with respect to one another at a shorter distance or pitch than the corresponding portions 5 of the fuel elements 4 forming a compact bundle. For this purpose the gas plenums 7 are provided immediately before the portions 5 with portions 24 which diameters are less than the diameters of the corresponding portions 5 of the fuel elements 4.

The gas plenums 7 are secured in the shell 23 by means of fixing gratings 25. The shell 23 itself is made as a hexagonal prism and its external surface is congruent to the internal surface of the wall of the shroud 1. Such shape of the shell 23 combined with the formation of a compact bundle of the gas plenums 7 permits lower flow resistance of the fuel assembly in the region of the gas plenums 7.

In another embodiment of a fuel assembly shown in FIG. 15 the gas plenums 7 of the peripheral group 9 for collection of gaseous fission products are located, according to the invention, downstream of the coolant before the portions 5 of the fuel elements 4 filled with the fissionable and raw materials 6. The shell is formed, as shown in FIG. 16, by these gas plenums 7 connected to one another by means of soldering or welding, for example. The gas plenums 7 (FIG. 15) of the peripheral group 9 are provided immediately before the portions 5 with portions 26 which diameters are less than the diameters of the corresponding portions 5 of the fuel elements 4. The gas plenums 7 of the central group 8 are located downstream of the coolant after the portions 5 of the fuel elements 4.

The external surface of the gas plenums 7 of the peripheral group 9 forming the shell is congruent to the internal surface of the shroud 1, as shown in FIG. 16. The clearance 12 between the walls of the shroud 1 of the fuel assembly and the shell formed by the gas plenums 7 of the periphery group 9 constitutes 0.5–5 mm. The downstream end 3 (FIG. 17) is provided with a slot 27 to secure the shell therein by inserting the gas plenums 7 forming said shell.

The fuel assembly for a fast-neutron nuclear reactor of FIGS. 18 and 19 differs from the fuel assembly of FIG. 15 in only that the gas plenums 7 of the central group 8, as well as the gas plenums 7 of the peripheral group 9, are located downstream of the coolant before the portions 5 of the fuel elements 4 inside a shell formed by the gas plenums 7 of the peripheral group 9.

The gas plenums 7 of the central group 8 are provided immediately before the portions 5 with portions 28 (FIG. 18) which diameters are less than the diameters of the corresponding portions 5 of the fuel elements 4.

In this embodiment of the fuel assembly the clear opening for the coolant in the region of the gas plenums 7 becomes larger, because there are no additional members in the structure of the fuel assembly and the shell is formed by the gas plenum 7 of the peripheral group 9.

In the embodiment of a fuel assembly of FIGS. 20 and 21 all gas plenums for collection of gaseous fission products of the central group 8 and the peripheral group 9 are located downstream of the coolant before the portions 5 of the fuel elements 4 filled with the fissionable and raw materials 6. The shell is formed, as can be seen in FIG. 21, by these gas plenums connected to one another by means of soldering or welding, for example.

All gas plenums 7 (FIG. 20) are provided immediately before the portions 5 with portions 26 and 28 which diameters are less than the diameters of the corresponding portions 5 of the fuel elements 4. The gas plenums 7 of the central group 8 feature bends on the portions 28 directed towards the periphery so that a shell is formed by these gas plenums 7. The external surface of the gas plenums 7 forming the shell is congruent to the internal surface of the shroud of the fuel assembly, as shown in FIG. 21.

The fuel assembly of a fast-neutron nuclear reactor of FIG. 1 operates as follows.

The coolant enters the fuel assembly through the inlet ports 10 of the downstream end of the fuel assembly, washes the gas plenums 7 located before the portions 5 of the fuel elements 4 filled with the fissionable and raw materials 6. A part of the coolant then comes into the clearance 12 formed by the walls of the shroud of the fuel assembly and the shell 13, whereas the bulk of the flow of the coolant washes the portions 5 of the fuel elements 4 accepting the heat released in the process of a nuclear chain reaction in these portions 5.

The coolant heated in the portions 5 of the fuel elements 3 washes then the gas plenums 7 located in the shroud 1 after the portions 5 of the fuel elements 4 and leaves the fuel assembly through the outlet ports 11 in the upstream end 2 of the fuel assembly.

As the coolant passes inside the fuel assembly, its pressure drops due to the flow resistance in all regions of the fuel assembly. That is why a lower coolant pressure settles in the clearance 14, that is immediately before the portions 5 of the fuel elements 4 downstream of the coolant, as compared to the coolant inlet pressure. The same lower pressure is settled in the clearance 12 between the walls of the shroud 1 and the shell 13. This means that the walls of the shroud bear a lower pressure, because the pressure in the interassembly space of the active zone is practically permanent and is practically equal to the coolant pressure at the outlet of the fuel assembly.

Other embodiments of the fuel assembly operate similarly to the embodiment of FIG. 1.

Such design of a fuel assembly permits, according to the invention, an approximately 30 percent reduction of the pressure rated for the shroud. The thickness of the shroud can thus be significantly reduced and the volume of constructional materials in the active zone of a nuclear fast-neutron reactor can also be reduced. The balance of neutrons in the active zone of the reactor is improved. There is at least 0.07 rise in the breeding gain and a 20 percent loss in the fuel doubling time.

What is claimed is:

1. In an improved fuel assembly for a fast-neutron nuclear reactor comprising a shroud, an upstream end, a downstream end and a plurality of fuel elements each having an individual gas plenum for collection of gaseous fission products and divided into two groups; an inner group including fuel elements adjacent to the longitudinal axis of the fuel assembly, and an outer group occupying the space between said shroud and the fuel elements of said inner group, the gas plenums of said inner group of the fuel elements being arranged at the coolant inlet side of the assembly, while the gas plenums of the outer group of the fuel elements are arranged at the coolant outlet side of the assembly, the improvement comprising an additional partition means or shell disposed within the space between the wall of said shroud and the bundle of gas plenums of said inner group of the fuel elements at the coolant inlet side, and said partition means or shell is connected to the wall of said shroud at the coolant inlet side to form a coolant stagnation zone open at the assembly fission zone; whereby stresses in the wall of said shroud are reduced.

2. A fuel assembly as claimed in claim 1 wherein the height of said partition means or shell is approximately equal to the length of said gas plenums for collection of gaseous fission products, located downstream of said coolant before said portions of said fuel elements filled with said fissionable and raw materials.

3. A fuel assembly as claimed in claim 1 wherein the external surface of said partition means or shell is congruent to the internal surface of said shroud.

4. A fuel assembly as claimed in claim 1, in which adjoining gas plenums for collection of gaseous fission products, located downstream of said coolant before said portions of said fuel elements filled with said fissionable and raw materials, are arranged with respect to each other at a shorter distance than the corresponding portions of said fuel elements filled with said fissionable and raw materials to form a compact bundle.

5. A fuel assembly as claimed in claim 1, wherein said gas plenums of said inner group of the fuel elements are brought into more compact bundles with the pitch or separation of said gas plenum pipes reduced as compared with the pitch or separation of the fuel elements in the assembly fission zone.

6. A fuel assembly as claimed in claim 1, wherein said gas plenums of the peripheral row of the fuel elements of said outer group are arranged at the coolant inlet side, and the walls thereof being connected to each other and to the wall of said shroud throughout the height to form said additional partition means or shell at the coolant inlet side.

7. A fuel assembly as claimed in claim 1, wherein said additional partition means or shell is made in the form of a truncated cone so as to permit more uniform flow of the coolant at the approach to the portions at the fuel elements filled with fissionable and raw materials.

8. A fuel assembly as claimed in claim 1, wherein said shroud is in the form of a hexagonal prism.

9. A fuel assembly as claimed in claim 8, wherein said additional partition means or shell is in the form of a hexagonal prism.

10. A fuel assembly as claimed in claim 8, wherein said additional partition means or shell is in the form of a tubular cylinder.

11. A fuel assembly as claimed in claim 1, wherein said gas plenums of said outer group are located in the clearance between the walls of said shroud and said additional partition means or shell.

12. A fuel assembly as claimed in claim 1, wherein both said inner and outer groups of said gas plenums are located in said shroud before the portions of the fuel elements filled with the fissionable and raw materials, and the gas plenums of said inner group are situated inside said additional partition means or shell, whereby the length of said fuel assembly is reduced by the length of the gas plenums.

* * * * *